April 14, 1936. P. M. FREER 2,037,227
PISTON
Filed June 25, 1934 2 Sheets-Sheet 1
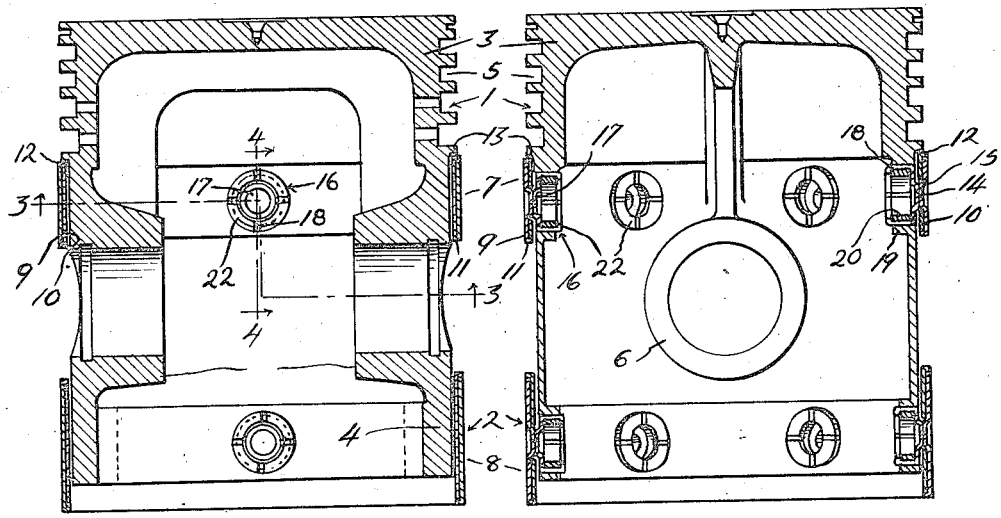
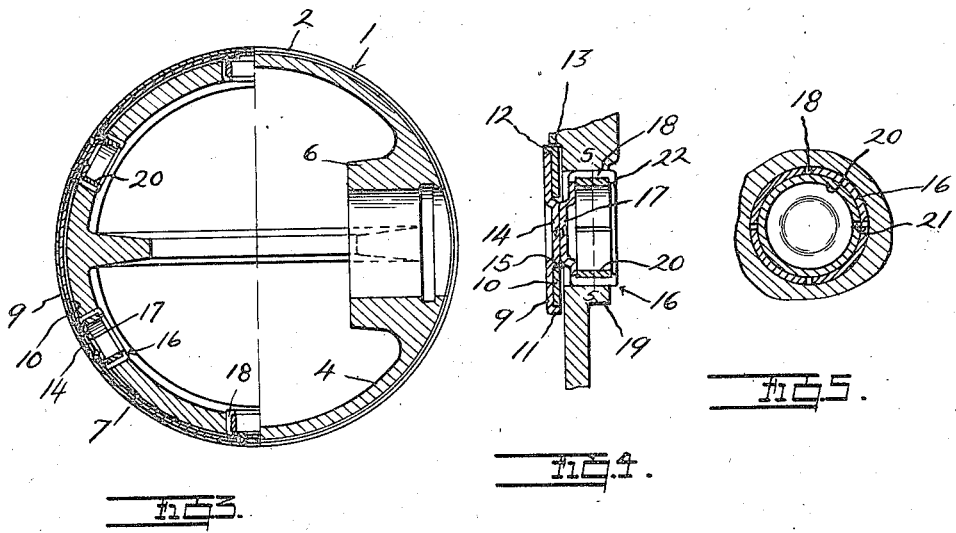
INVENTOR
Phelps M. Freer
BY Whittemore Hulbert Whittemore Belknap
ATTORNEYS April 14, 1936. P. M. FREER 2,037,227
PISTON
Filed June 25, 1934 2 Sheets-Sheet 2
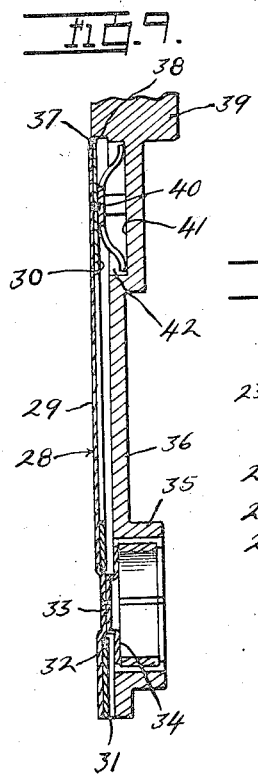
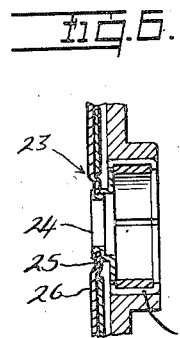
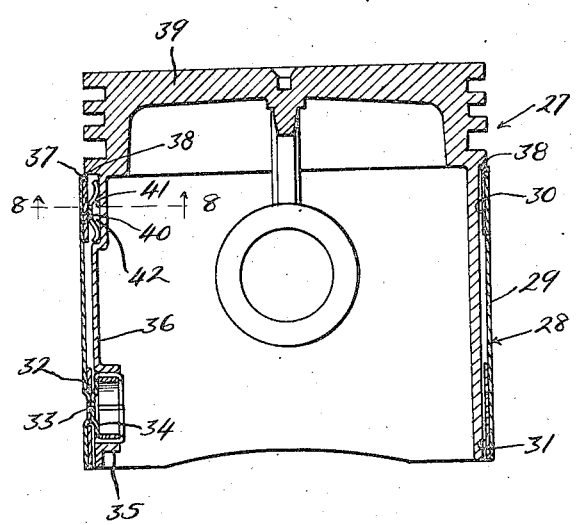
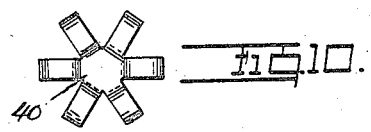
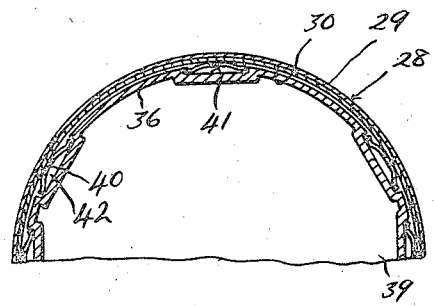
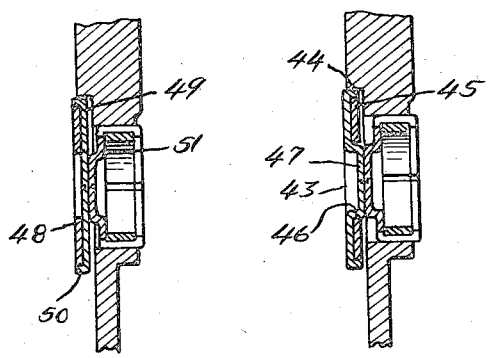
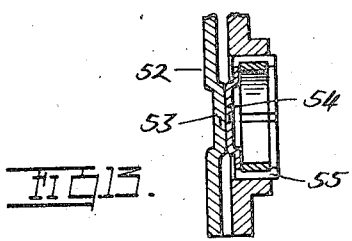
INVENTOR
Phelps M. Freer
BY
ATTORNEYS Patented Apr. 14, 1936

2,037,227

UNITED STATES PATENT OFFICE 2,037,227

PISTON

Phelps M. Freer, Detroit, Mich.

Application June 25, 1934, Serial No. 732,361

7 Claims. (Cl. 309—15)

The invention relates to pistons and refers more particularly to pistons designed for use in internal combustion engines.

The invention has for one of its objects to provide a strong and relatively light weight composite piston having the body and cylinder wall engaging skirt formed of different materials and constructed so that the cylinder wall engaging skirt will wear good and not cause objectionable resistance to movement of the piston in the cylinder. Another object is to so construct the piston that the parts thereof may be readily secured together and relative expansion and contraction of the body and the cylinder wall engaging skirt may occur without the connection between its parts becoming loosened. Further objects are to provide an improved construction of cylinder wall engaging skirt and to provide an improved construction for securing the body and the cylinder wall engaging skirt together.

These and other objects of the invention will become apparent from the following description, taken in connection with the accompanying drawings, in which Figures 1 and 2 are sections at right angles to each other of a piston showing an embodiment of my invention;

Figures 3 and 4 are cross sections on the lines 3—3 and 4—4 respectively of Figure 1, Figure 4 being enlarged;

Figure 5 is a cross section on the line 5—5 of Figure 4;

Figure 6 is a view similar to Figure 4, showing a modification;

Figure 7 is a view similar to Figure 2, showing another embodiment of my invention;

Figure 8 is a cross section on the line 8—8 of Figure 7;

Figure 9 is an enlarged view of a portion of Figure 7;

Figure 10 is a cross section on the line 10—10 of Figure 9;

Figures 11 and 12 are views similar to Figure 4 showing other modifications;

Figure 13 is a view similar to Figure 4 showing still another modification.

The composite piston shown in Figures 1 to 5 inclusive comprises the head and body unit 1 which is formed of a light material, such as magnesium or a magnesium alloy, or aluminum or an aluminum alloy, and the cylinder wall engaging skirt 2 which is formed of a material having good wearing properties, such as sheet metal and preferably sheet steel, the outer face of which is preferably tin plated. The head and body unit 1 comprises the head 3 and the body 4 integral with the head. The head is provided with the ring receiving grooves 5 and has an external diameter preferably less than the external diameter of the skirt 2. The body 4 is provided with the axially aligned hubs 6 having axially aligned openings for receiving the wrist pin and the body has an external cylindrical surface with an external diameter less than that of the head 3 and also less than the internal diameter of the skirt 2.

The cylinder wall engaging skirt 2 is formed of the separate sections 7 and 8 which are adapted to be sleeved over the body 4 from its lower end and to normally clear the body and to have the usual clearance within the cylinder of an internal combustion engine. The section 7 is located intermediate the ends of the head and body unit 1 and at the upper end of the body 4 approximately above the hubs 6. The section 8 is located at the lower end of the body 4 and, as shown, preferably extends therebelow. These two sections together provide sufficient area of contact with the cylinder wall in zones spaced longitudinally of the piston to secure good wear and at the same time to avoid objectionable resistance to movement of the piston.

The section 7 comprises the continuous or endless outer annulus 9 which is preferably formed of thin tin plated sheet steel and the continuous or endless inner annulus 10 which is preferably formed of the same material as the outer annulus. The outer annulus has at its lower edge the inturned flange 11 which extends over the lower edge of the inner annulus and the inner annulus is formed at its upper edge with the out-turned flange 12, which extends over the upper edge of the outer annulus. This flange 12 is located closely adjacent to the shoulder 13 formed upon the head 3. The inner annulus reinforces and stiffens the outer annulus and the flanges upon these annulii also serve to reinforce the same. The outer annulus 9 is provided with the angularly spaced radially inwardly depressed portions 14 which extend through the openings 15 in the inner annulus 10, the depressed portions also serving in positioning the inner annulus with respect to the outer annulus. To allow relative expansion and contraction of the body 4 and the section 7 and also to secure the section 7 to the body 4, I have provided the tubular members 16. These tubular members are cup-shaped and have in the bottoms of their cups the radially outwardly depressed portions 17 for abutting the radially inwardly depressed portions 14, the axes of these depressions being in substantial alignment. The side walls of the cups are longitudinally slotted at 18 so that these side walls are formed of flexible portions. The tubular or cup-shaped members engage in the angularly spaced radially extending tubular bearings 19 formed in the body 4 in substantially axial alignment with the inwardly depressed portions 14 and the flexible portions of the side walls of these members are resiliently urged outwardly into firm engagement with the bearings by the resilient tubular members 20 which, as shown, are longitudinally slotted at 21. To hold the tubular members 20 from accidental disengagement, the inner edges of the tubular or cup-shaped members 16 are crimped over the resilient members to provide the flanges 22.

The section 8 of the cylinder wall engaging skirt 2 is formed in the same manner as the section 7, with the exception that the section 8 is of greater width than the section 7. Also this section 8 is secured to the body 4 in the same manner as the section 7 is secured to the body 4.

To assemble the composite piston, the tubular or cup-shaped members 16 for the upper section 7 and also the corresponding tubular or cup-shaped members for the lower section 8 are inserted into their respective bearings 19 in the body 4. The resilient expanding members 20 preferably have been placed and secured in these tubular or cup-shaped members prior to their insertion. The sections 7 and 8 are then sleeved over the body 4, the tubular or cup-shaped members having been inserted far enough to provide for this operation. Then with the sections 7 and 8 positively held concentric with the body 4 and the radially inwardly depressed portions 14 registering with the radially outwardly depressed portions 14 registering with the radially outwardly depressed portions 17, these portions are secured together by being welded.

In the modification shown in Figure 6, the tubular or cup-shaped members 22 are secured to the section 23 of the cylinder wall engaging skirt by forming their bottoms into hollow rivets 24, which are crimped over the circular edges of the apertured radially inwardly depressed portions 25 of the outer annulus 26. With this modification, the same method of assembly is preferably used, with the exception that the final operation consists in the riveting of the tubular or cup-shaped members to the outer annulus.

In the modification shown in Figures 7, 8, 9 and 10, the head and body unit 27 is formed in the same manner as the head and body unit 1, but the cylinder wall engaging skirt 28 is formed of the thin sheet steel annulus 29 which is preferably tin-plated and the upper and lower reinforcing annulii 30 and 31 respectively, the annulii being within the annulus. The lower annulus 31 is provided with the angularly spaced openings 32 through which extend the radially inwardly depressed portions 33 in the lower portion of the annulus 29. These depressed portions are fixedly secured as by welding to the tubular or cup-shaped members 34 located in the tubular bearings 35 formed in the lower end of the body 36. The tubular or cup-shaped members 34 are formed in the same manner as the tubular or cup-shaped members 16 and their flexible side wall portions are resiliently urged outwardly into engagement with the bearings in the same manner. The upper reinforcing annulus 30 is preferably welded to the annulus 29 and this annulus 30 is provided at its upper edge with the out-turned flange 37 which extends over the upper edge of the annulus 29 and into close proximity to the shoulder 38 formed upon the head 39. The upper annulus 30 and also the upper portion of the annulus 29 is resiliently urged radially outwardly and also resiliently centered by the spring spiders 40 having their central portions slidably contacting with the upper annulus 30 and the ends of their arms contacting with the bottoms 41 of the recessed portions 42 formed in the body 36. These recessed portions 42 have the same angular spacing and relation as the bearings 35. This construction provides for relative longitudinal expansion and contraction of the body 36 and the cylinder wall engaging annulus 29 above the zones of connection of the two and also provides for the relative radial expansion and contraction.

In the modification shown in Figure 11, the outer annulus 43 of the cylinder wall engaging skirt is channel-shaped in section, it having the inturned flanges 44 at its upper and lower edges. The inner annulus 45 is of a size to be received within the outer annulus, the flanges 44 thus positioning the two annulii with respect to each other. The inner annulus is provided with the angularly spaced openings 46 for receiving the radially inwardly depressed portions 47 of the outer annulus.

In the modification shown in Figure 12, the outer annulus 48 of the cylinder wall engaging skirt may be formed of the same material as the outer annulii previously described, or it may be formed of hard steel or made of special bearing metal. The inner annulus 49 is preferably formed of the same material as the inner annulii previously described. This inner annulus 35 is channel-shaped in section and has the outturned flanges 50 for positioning the outer annulus. The section is secured to the piston body by the same construction of tubular or cup-shaped members 51 as previously described and to enable direct securing of the bottoms of these members to the inner annulus, the outer annulus is provided with the openings 52 in substantially axial alignment with the depressed portions in the bottoms of the tubular or cup-shaped members whereby the outer welding jaws or the outer riveting tools may be inserted through these openings to contact directly with the inner annulus or the riveting portions of the tubular or cup-shaped members.

Figure 13 shows another modification in which the annulus 52 of the cylinder wall engaging skirt is of greater thickness, so that it need not be reinforced by an inner annulus. This annulus 52 has the annular series of radially inwardly depressed portions 53 which are fixedly secured to the radially outwardly depressed portions 54 in the bottoms of the securing members 55 which are tubular or cup-shaped and formed in the same manner as those previously described. As shown, the depressed portions are connected together by welding, but it is apparent that they might also be connected together by riveting.

What I claim as my invention is:

1. In a piston, the combination with a body having angularly spaced radially extending tubular bearings, of a cylinder wall engaging annulus encircling said body and having radially inwardly depressed portions in substantially axial alignment with said tubular bearings, and tubular members within and engaging said tubular bearings and fixedly secured to said depressed portions, said tubular members slidably engaging said tubular bearings in radial directions and said tubular members being expansible and contractible to maintain a tight fit with said tubular bearings at all times.

2. In a piston, the combination with a body having angularly spaced radially extending tubular bearings, of a cylinder wall engaging annulus encircling said body in the zone of said tubular bearings, said annulus having an internal diameter greater than the external diameter of said body from the zone of said tubular bearings to one end of said body, said annulus also having radially inwardly depressed portions in substantially axial alignment with said tubular bearings, and tubular members within and resiliently engaging said tubular bearings and fixedly secured to said depressed portions, said tubular members slidably engaging said tubular bearings in radial directions and having tight fit therewith at all times.

3. In a piston, the combination with a body having angularly spaced radially extending tubular bearings, of a cylinder wall engaging annulus encircling said body, an annulus within and reinforcing said first mentioned annulus and provided with openings in substantially axial alignment with said bearings and tubular members within said bearings and secured to said first mentioned annulus through said openings.

4. In a piston, the combination with a body, of a cylinder wall engaging annulus encircling said body, an annulus within and reinforcing said first mentioned annulus and provided with openings, flange means upon one of said annulii extending beyond an end of the other of said annulii for reinforcing said first mentioned annulus and positioning the same relative to the second mentioned annulus, and means carried by said body and secured to said first mentioned annulus through the openings in said second mentioned annulus.

5. In a piston, the combination with a body, of a cylinder wall engaging annulus encircling said body, said annulus having a channel-shaped section and having radially inwardly depressed portions, an annulus within and reinforcing said first mentioned annulus and provided with openings through which said depressed portions extend, and members carried by said body and secured to said depressed portions.

6. In a piston, the combination with a body, of a cylinder wall engaging annulus encircling said body, an annulus reinforcing said first mentioned annulus, and securing members carried by said body and secured to one of said annulii, the other of said annulii having openings in substantially axial alignment with said securing members whereby said securing members may be secured directly to said first mentioned annulus.

7. In a piston, the combination with a body, of a cylinder wall engaging annulus encircling said body and provided with openings, an annulus reinforcing said first mentioned annulus, and securing members carried by said body and secured to said last mentioned annulus in substantially axial alignment with said openings.

PHELPS M. FREER.